April 16, 1940.　　　　　F. O. CONILL　　　　　2,197,449
LIQUID CONTAINER
Filed Feb. 16, 1937　　　　5 Sheets-Sheet 1
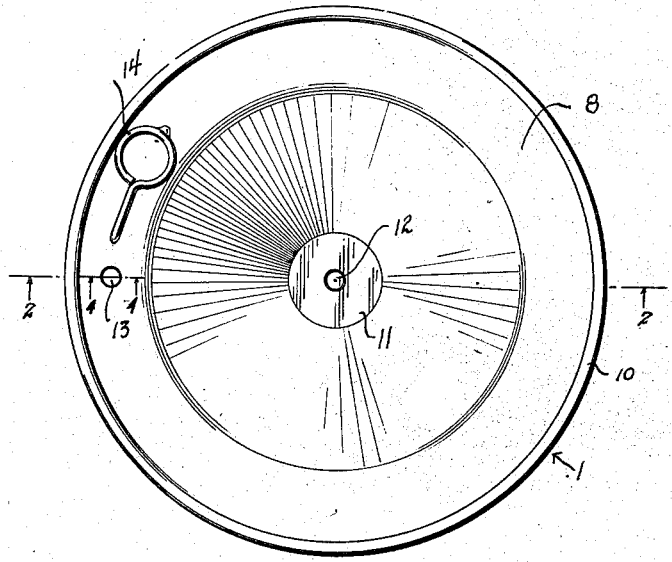
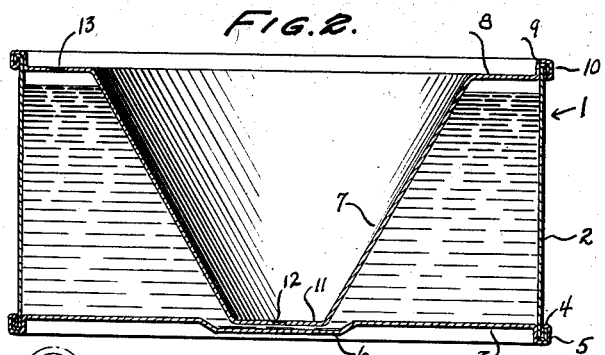
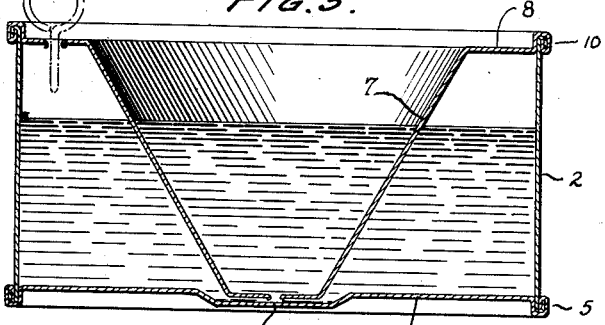
Inventor.
FERNAN O. CONILL
By Semmes & Semmes
Attorneys April 16, 1940.　　　　F. O. CONILL　　　　2,197,449
LIQUID CONTAINER
Filed Feb. 16, 1937　　　　5 Sheets-Sheet 2
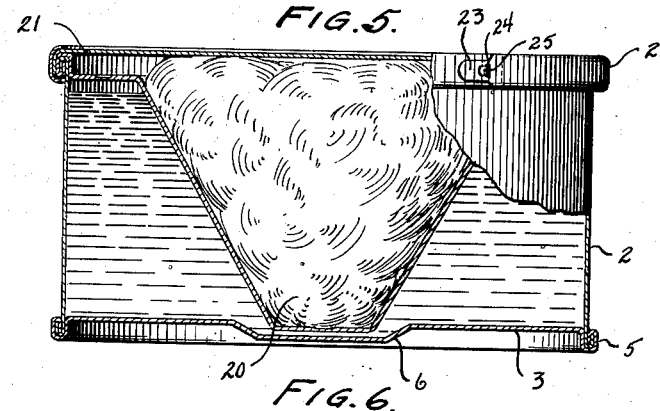
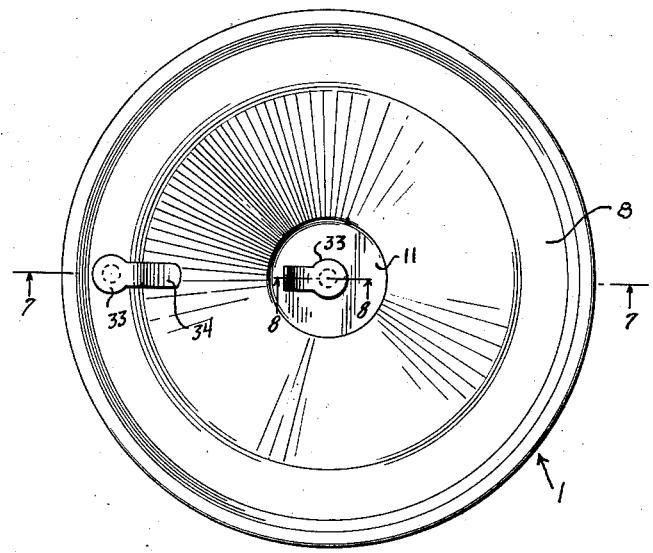
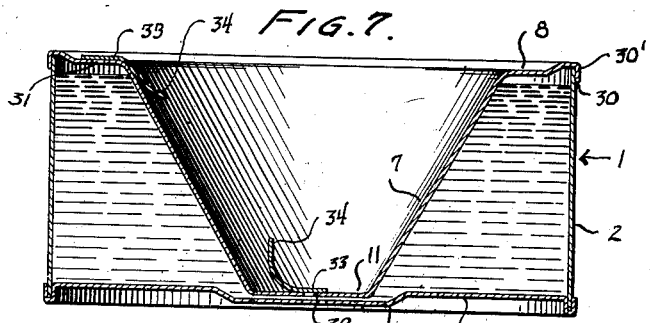
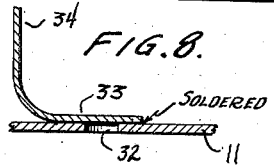
Inventor
FERNAN O CONILL
By Semmes & Semmes
Attorneys April 16, 1940.  F. O. CONILL  2,197,449
LIQUID CONTAINER
Filed Feb. 16, 1937   5 Sheets-Sheet 3

Inventor.
FERNAN O. CONILL
By Semmes & Semmes
Attorneys

April 16, 1940.　　　　F. O. CONILL　　　　2,197,449
LIQUID CONTAINER
Filed Feb. 16, 1937　　　　5 Sheets-Sheet 4

Inventor
FERNAN O. CONILL
By Semmes & Semmes
Attorneys

April 16, 1940.　　　　F. O. CONILL　　　　2,197,449
LIQUID CONTAINER
Filed Feb. 16, 1937　　　5 Sheets-Sheet 5

Inventor.
FERNAN O. CONILL
By Semmes & Semmes
Attorneys

Patented Apr. 16, 1940

2,197,449

UNITED STATES PATENT OFFICE 2,197,449

LIQUID CONTAINER

Fernan O. Conill, New York, N. Y.

Application February 16, 1937, Serial No. 126,061

2 Claims. (Cl. 220—9)

My invention relates to containers and more particularly liquid containers which cannot be refilled after they have been used.

An object of my invention is to provide a liquid container which can be manufactured at low cost and which is highly efficient and durable.

Another object of my invention is to provide a liquid container consisting of an outer and inner receptacle which is provided with means for feeding the liquid from the outer receptacle into the inner receptacle.

Yet another object of my invention is to provide a container which may be used for liquids employed in connection with permanent hair waving apparatus.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is a top plan view of the preferred embodiment of my invention.

Figure 2 is a view taken along the line 2—2 of Figure 1 looking in the direction of the arrows.

Figure 3 is a view similar to Figure 2 showing the receptacle in use.

Figure 4 is a view taken along lines 4—4 of Figure 1 looking in the direction of the arrows.

Figure 5 is an elevational view partly in section showing a modified form of Figure 1 provided with a band for removably securing a top to the container.

Figure 6 is a top plan view of still another embodiment of my invention.

Figure 7 is a view taken along line 7—7 of Figure 6 taken in the direction of the arrows.

Figure 8 is a view taken along lines 8—8 of Figure 6 looking in the direction of the arrows.

Figure 9:
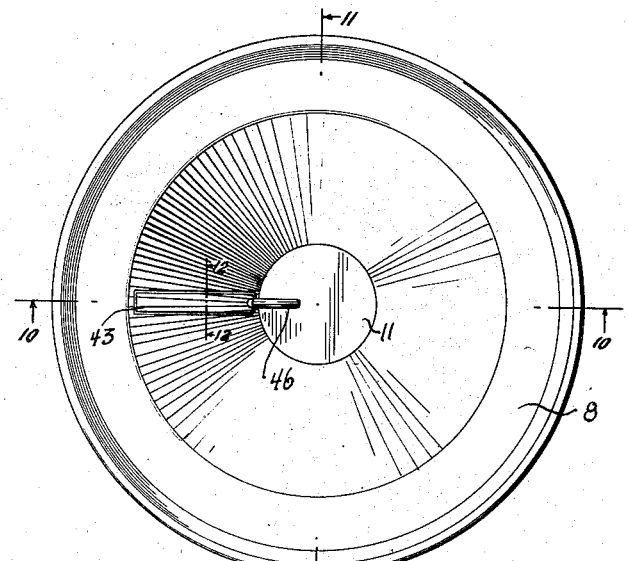
Figure 9 is a top plan view of still another modification of my concept.

Referring to the drawings and more particularly to Figure 1 there is shown a container designated generally 1. The body portion of the container made up of a side wall 2 and a bottom closure 3. The bottom closure 3 is crimped to the side wall as at 4, forming a double seam 5. The seam 5 in addition to affording a leakproof union also serves as a supporting element for the container. The bottom closure 3 is provided with a centrally disposed well portion 6, the purpose of which will later be more thoroughly discussed.

A second container 7 of truncated cone shape is adapted to be positioned within the container 1. The larger end of the container 7 is provided with a peripheral flanged portion 8 which terminates in an upwardly extending portion 9. The upwardly extending portion 9 is crimped to the side wall 2 forming a double seam 10. A smaller end 11 of the container 7 extends downwardly into the well 6. It should be noted that the end 11 extends below the bottom closure 3 due to the well 6.

As shown in Figure 2 the outer container is adapted to be filled with suitable liquid in any desired manner. After the necessary amount of liquid has been admitted into the container 1, the container 7 is positioned therein and is crimped to the side wall 2 in the manner hereinbefore pointed out.

In order to permit the liquid from the container 1 to flow into the container 7 I provide the following arrangement:

The smaller end 11 of the inner container 7 is provided with a weakened area 12. The weakened area 12 is of such thickness as will permit a pointed object to be inserted therethrough with a minimum of effort. The flanged portion 8 of the container 7 is also provided with a weakened area 13. The weakened areas 12 and 13 are identical in construction and the area 13 is clearly depicted in Figure 4. As shown in Figure 1 a suitable piercing or punching member 14 can be secured to the flanged portion 8 by soldering or the like.

When the area 12 is opened the liquid will tend to seep into the container 7 but due to the vacuum created in the container 1 only a small amount of water will enter the container 7. However, by opening the area 13 the vacuum will be broken and the liquid will assume the level depicted in Figure 3.

In the event it is desired to ship the containers, a quantity of suitable absorbent material can be placed within the inner container 7 for use as an applicator and the entire container can be wrapped in some material such as Cellophane or the like. It will be appreciated that such a container will provide a very attractive and saleable article. Moreover the container cannot be refilled after use.

In Figure 5 I have shown the container depicted in Figure 2 as being provided with a suitable closure member. In this form it can be seen that suitable absorbent material 20 is disposed within the container 7. This material, of course, can be used as an applicator for the liquid contained in the container 1. A flanged top 21 is fitted over the seam 10 and is held in place by means of a removable flanged band 22. One of the free ends of the band 22 is provided with a tapered portion 23 having a slot 24. The other free end of the band is provided with a tab 25 which extends through the slot 24 to hold the band in place. The band 22 can be removed by withdrawing the tab 25 from the slot thereby freeing the band. Of course it is to be understood that other sealing structures may be employed in lieu of the band.

In Figures 6 and 7 I have shown a somewhat modified form of the container depicted in Figure 1. The free end 30' of the inner container 7 instead of being crimped to the side wall 2 as shown in Figure 2 is soldered thereto as at 30. Apertures 31 and 32 are provided in the periphery 8 and the smaller end 11 of the container 7, respectively. Tabs 33 each having an upwardly depending portion 34 are secured over the apertures 31 and 32. As shown in Figure 8 the tab 33 may be secured over the aperture 32 by soldering to the bottom 11.

In this form of container the removal of the tabs from the apertures 31 and 32 will cause the liquid contained in the outer container to flow into the inner container.

I have shown still another embodiment of my invention in Figures 9 to 14 inclusive. In this form it can be seen that the side and bottom walls of the outer container are made of a single piece depicted 40. The larger end of the inner container 7 is secured to the container 4 by soldering as at 41. The smaller end 11 of the inner container abuts the bottom closure of the container 40.

In order to permit the water in the outer container to flow into the inner container, the inner container is provided with a weakened area or rip strip 43 which is formed by a pair of parallel grooves 44 and 45. The area 43 extends from substantially the lower end to the upper end of the container 7. A ring 46 is secured to the lower end of the rip strip 43 as at 47.

Figure 10:
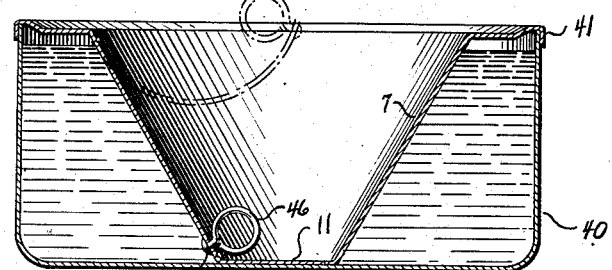
Figure 10 is a view taken along line 10—10 of Figure 9 looking in the direction of the arrows.
Figure 11:
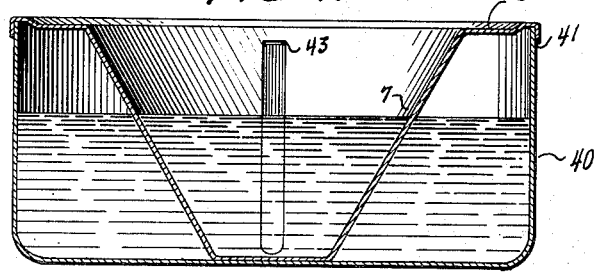
Figure 11 is a view taken along lines 11—11 of Figure 9.

By pulling the ring 46 to the position shown by dotted lines in Figure 10, the weakened area 43 will be opened and the liquid will flow into the inner container.

Figure 13:
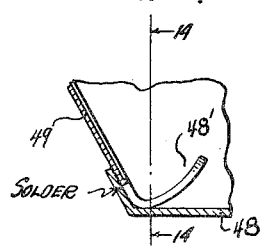
Figure 13 is a view taken along lines 13—13 of Figure 14.
Figures 12, 14:
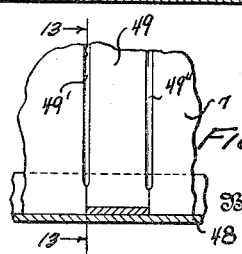
Figure 12 is a view taken along lines 12—12 of Figure 9.
Figure 14 is a view taken along lines 14—14 of Figure 13.
Figure 15:
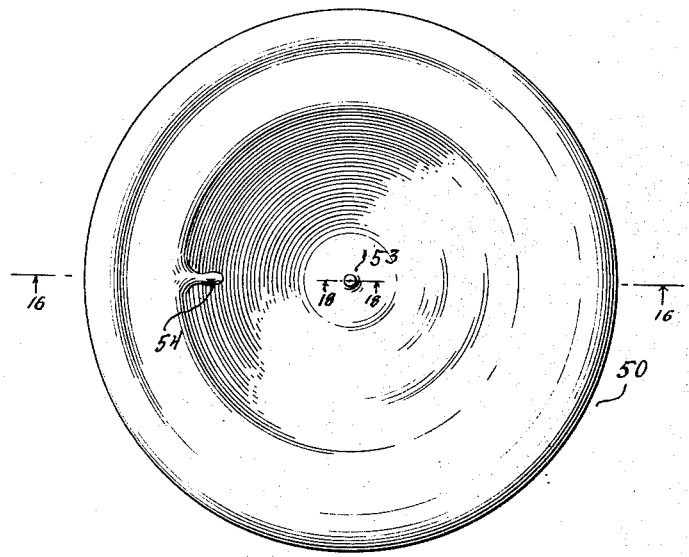
Figure 15 is a top plan view of still another modified form of my container.

Referring to Figures 13 and 14, there is shown another form of my container. In this form, the inner container 7 is provided with a separate bottom 48. As depicted in Figure 13 the bottom 48 may be secured to the inner container by soldering or the like.

The inner container is also provided with a weakened area 49 formed by a pair of grooves 49' and 49''. A tab 48' is provided for removing the weakened area when it is desired to use the container.

Figure 16:
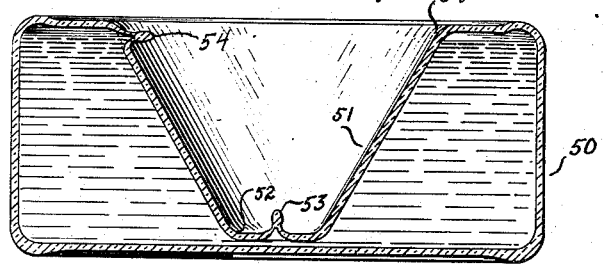
Figure 16 is a view taken along lines 16—16 of Figure 15.
Figure 17:
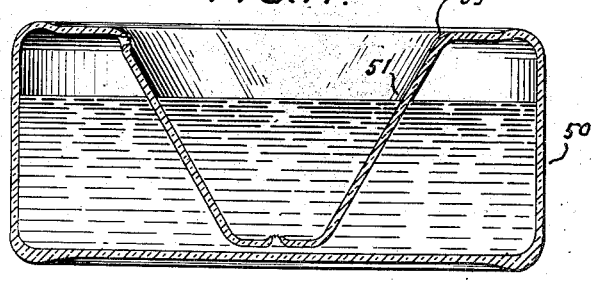
Figure 17 is a view similar to Figure 16 showing the container in use.
Figure 18:
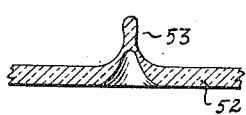
Figure 18 is a view taken along lines 18—18 of Figure 15.

In Figures 15 to 18, I have shown my container as being made of glass or similar material. The outer and inner containers 50 and 51 as clearly shown in Figure 16 are molded into a unitary receptacle. A small end 52 of the inner container 51 is provided with a nib 53. As shown in Figure 18, the nib 53 may be blown into the desired shape. Similarly a nib 54 is provided adjacent a large end 55 of the container 51. As the nibs 53 and 54 are frangible it will be appreciated that when they are broken the liquid in the outer container 50 will flow into the inner container 51 by gravity.

Figure 19:
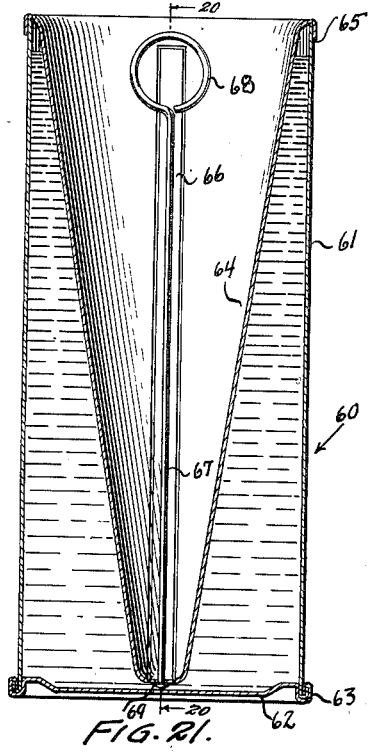
Figure 19 is an elevational view in section showing still another embodiment of my invention.
Figure 20:
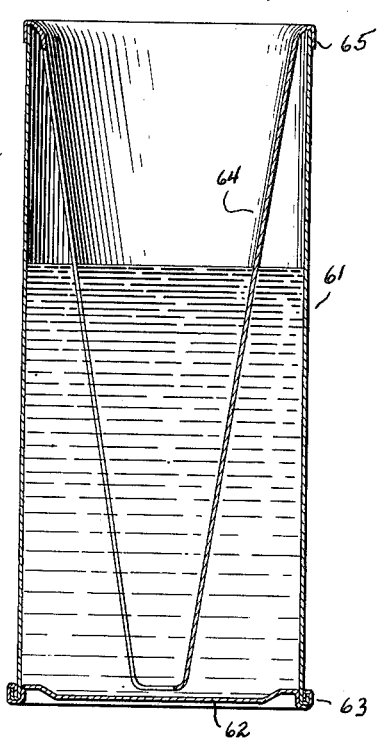
Figure 20 is a view taken along lines 20—20 of Figure 19.

In Figures 19 and 20 I have shown my concept as applied to a drinking vessel. In this form the outer container designated 60 is composed of a side wall 61 and a bottom closure 62. The bottom closure 62 is crimped to the side wall 61 as at 63 affording a leakproof joint.

An inner container 64 of conical configuration is disposed within the container 60 and is secured to the side wall by soldering as at 65. The inner container 64 extends from the upper end of the container 60 to substantially the bottom closure 62.

In order to permit the liquid in the outer container 60 to flow into the inner container, the inner container 64 is provided with a weakened area or rip strip 66. A suitable operating member 67 provided with a finger grip 68 is secured to the end of the weakened area as at 69. By pulling the operating member 67 the area 66 will be removed and the liquid will flow into the inner container.

It is believed apparent that the foregoing container may be employed as a container for liquids such as beer or the like. Not only will the receptacle be used as a container for the liquid when not in use but it also can be used for drinking purposes.

Figure 21:
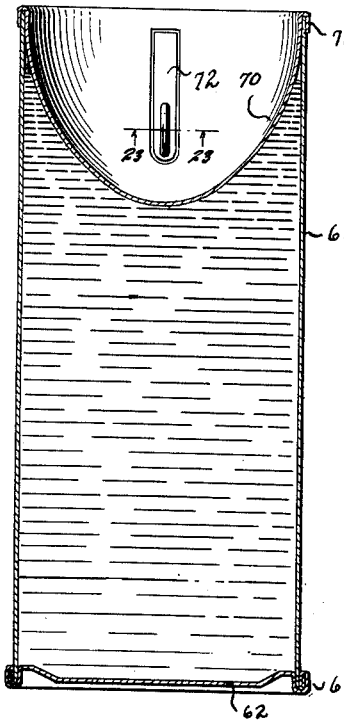
Figure 21 is an elevational view in section showing still another form of my invention.
Figure 22:
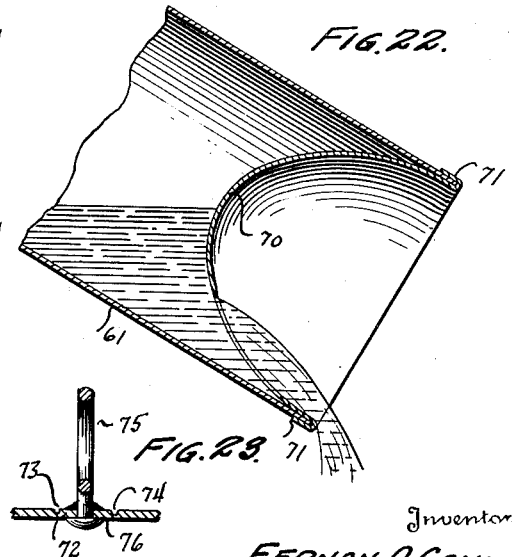
Figure 22 is a detailed view in section showing the container in Figure 21 in use.
Figure 23:
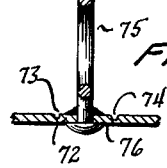
Figure 23 is a view taken along lines 23—23 of Figure 21.

In Figures 21 to 23 inclusive I have shown another form of drinking vessel. In this form the inner container 70 is of concave configuration and is secured to the side wall 61 by soldering as at 71. It should be noted that the inner container 70 extends into the outer container 60 approximately one third of the height of the container 60.

In order to permit the liquid to flow into the container 70, a weakened area 72 formed by grooves 73 and 74 is provided in the container 70. An operating member 75 is secured to the weakened area as at 76. Obviously when the operating member 75 is pulled the weakened area 72 will be removed.

In this form of device, however, it is necessary that the container 60 assume an angular position before the liquid will flow into the inner container. This is, of course, due to the fact that the inner container extends but a short distance within the outer container.

From the foregoing description, it is believed apparent that I have provided a liquid container which cannot be refilled after it has been used. Furthermore, I have devised a container which can be easily and cheaply manufactured and yet which is efficient and positive in operation.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A device of the character described comprising an outer container, an open top inner container having increasing width toward its top, the inner container being mounted within the outer container and extending substantially to the bottom of the outer container with its bottom slightly spaced from the bottom of said outer container, said inner container being secured and sealed at its upper end to the upper end of the outer container, said inner container having a substantially smooth and even inner surface for harmless and thorough wiping contact of absorbent material, said inner container having rupturable means at its bottom and the device being provided with additional rupturable means at its top adapted when ruptured to admit air to the outer container to permit the liquid to flow from the outer container through an opening, provided by rupturing the first-mentioned rupturable means, to the inner container.

2. A liquid receptacle comprising an outer container having an imperforate bottom adapted to contain a liquid, an inner container within said outer container and having a bottom in closely spaced relation with the bottom of the outer container, the bottom of said inner container being provided with rupturable means, a top joining and sealing the upper portion of the outer container to the upper portion of the inner container, said top being provided with rupturable means adapted when ruptured to admit air to permit the liquid to flow from the outer container through an opening, provided by rupturing the first-mentioned rupturable means, to the inner container.

FERNAN O. CONILL.